June 26, 1934.  P. C. GUNTRUP  1,964,151

COFFEEPOT

Filed Feb. 5, 1931  2 Sheets-Sheet 1

Inventor:
Paul C. Guntrup,
Kerr Hudson & Kent
attys.

June 26, 1934.  P. C. GUNTRUP  1,964,151
COFFEEPOT
Filed Feb. 5, 1931  2 Sheets-Sheet 2

Inventor
Paul C. Guntrup
Kwis Hudson & Kent
attys

Patented June 26, 1934

1,964,151

UNITED STATES PATENT OFFICE 1,964,151

COFFEEPOT

Paul C. Guntrup, Canton, Ohio

Application February 5, 1931, Serial No. 513,623

6 Claims. (Cl. 53—3)

This invention relates to a coffee pot and more particularly to a coffee pot for making coffee by the drip process wherein water substantially at boiling temperature is allowed to pass or percolate through a mass of ground coffee arranged in a container having a perforate bottom for leaching the coffee and extracting the strength therefrom, the resulting beverage passing from the coffee container through the openings in the bottom thereof into a suitable pot or receptacle.

Ordinarily coffee pots for making drip coffee comprise three elements, namely, the water reservoir, the coffee container, and the pot or receptacle for the brewed coffee or beverage. Since the perforations in the bottom of the container for the ground coffee must be relatively small to prevent the coffee grounds from passing therethrough into the beverage it has not been advantageous to construct coffee pots of this character and particularly the container for the ground coffee of enamel ware, earthen ware or similar materials. It is difficult to form small perforations in an article if it has been enameled without cracking the enamel, while, if such perforations are formed in the article before enameling, the enameling thereof will fill the small perforations with enamel material and necessitate the cleaning out of each opening or perforation and will require a rigid inspection of the article to determine if all the perforations or openings are clear. This inspection and the cleaning out of such perforations or openings that are filled with enamel are tedious and time consuming and materially increase the cost of production.

One of the main objects of the present invention is to provide a construction for a coffee pot of the character above set forth which enables the coffee pot to be formed of enamel ware, earthen ware and similar materials and, at the same time, permits of economical manufacture of the coffee pot.

In the making of coffee by the drip process the ground coffee in the coffee container becomes momentarily effervescent as it absorbs the water which first drips from the water reservoir. This effervescence is caused to a large extent, by the free oils and air which are contained in the ground coffee being rapidly released and this condition requires that some means for venting this liquid and air be provided when the container for the ground coffee is separate and apart from the rest of the pot so as to allow the air and effervescent liquid to escape into the receptacle for collecting the finished beverage and thus prevent an overflowing of the coffee container resulting in coffee grounds being carried into the receptacle.

Another important object of the present invention is to provide a construction for a coffee pot of the character set forth wherein means is arranged for allowing the effervescent liquid that accumulates in the coffee container and the air that is included in the expanded and compacted mass of ground coffee, to pass or flow from the container and into the pot or receptacle for the beverage or brewed coffee.

A further object is to provide a construction for a coffee pot of this character wherein the elements comprising the coffee pot, when assembled, are positively interlocked so that the coffee pot can be handled as a unit without danger of the elements thereof becoming separated.

Additional objects and advantages residing in the present invention will become more apparent hereinafter as the detailed description of several embodiments thereof proceeds.

Figures 1, 2:
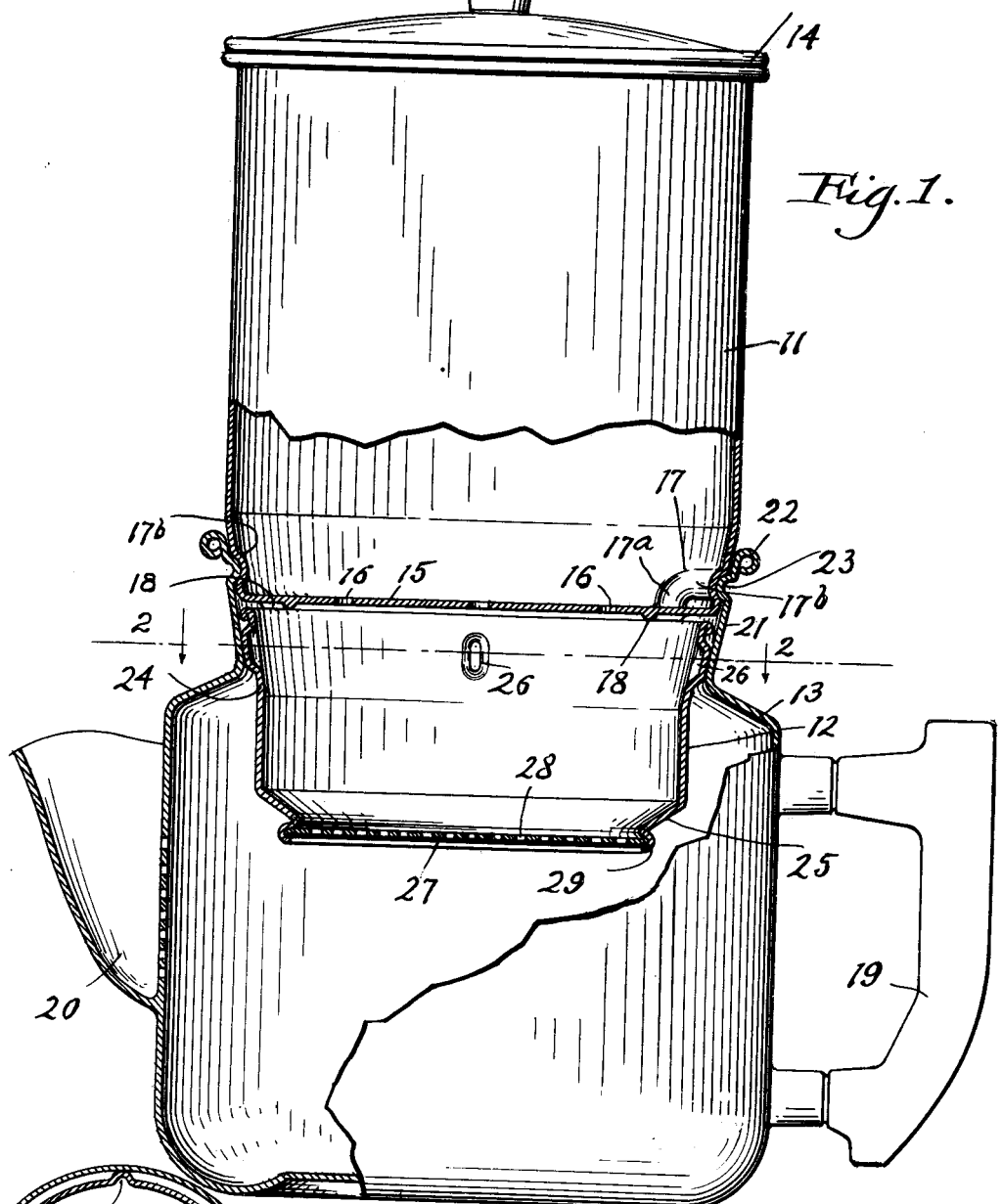
Figure 1 is an elevational view of one embodiment of the invention certain portions thereof being shown in section to clearly illustrate their construction and manner of cooperation with each other.
Fig. 2 is a reduced horizontal sectional view taken substantially on line 2—2 of Fig. 1 looking in the direction of the arrows.

Referring first to the construction disclosed in Figs. 1 and 2, it will be seen that the coffee pot comprises three main elements, namely the water reservoir 11, the coffee container 12, and the receptacle or pot 13 for the beverage or brewed coffee. Although the coffee pot may be constructed of any desirable material, the following description thereof will, in the main, describe the coffee pot with reference to its being formed of enamel ware since the construction of the coffee pot is such as to adapt it particularly to enamel ware.

The water reservoir 11 is provided at its open end with a suitable cover 14 while its bottom 15 has arranged therein a number of perforations 16, such perforations being larger than are the perforations in the coffee container and therefore capable of being readily formed in the bottom of the water reservoir even though the reservoir is an enameled article. The perforations or openings 16 may be formed in the bottom 15 of the reservoir after the enameling operation or they may be formed therein prior to the enameling operation and since they are relatively large there will be little danger of the enamel filling or plugging these openings. In addition, the number of the openings 16 is relatively small as compared to the number of openings in the bottom of the coffee container and therefore any inspection to determine whether these openings had become partly or fully closed during the enameling process would not be difficult and could be quickly carried out.

The end of the water reservoir 11 adjacent the bottom 15 is reduced in diameter slightly by forming the side walls thereof with an inward taper, the purpose of such an arrangement being to permit easy insertion of the reservoir into the beverage receptacle or pot when the elements of the coffee pot are being assembled as will later become clear. This reduced or tapered portion of the water reservoir 11 is further provided with one or more indentations 17 having a portion 17a extending substantially longitudinally of the water reservoir and another portion 17b extending in a direction circumferential of the water reservoir, such indentation 17 forming what may be called a bayonet-slot and cooperating with a portion of the receptable or pot 13 as will later be explained. The bottom 15 of the reservoir 11 is provided on its underside and adjacent its circumferential edge with a plurality of downwardly extending (as viewed in the drawings) lugs 18, the purpose of which will also be explained more in detail hereinafter.

The pot or receptacle 13 for the beverage or brewed coffee has a suitable handle 19, preferably insulated of course from the pot or receptacle, and the usual pouring spout 20. The open end of the pot or receptacle 13 is contracted in diameter as indicated at 21, such contracted portion being outwardly flared, as illustrated, and having an outturned reenforcing and decorative bead 22 at its outer end. The portion 21 adjacent its outer end is provided with one or more indentations 23 spaced circumferentially thereof with respect to each other and which are preferably circular indentations or bayonet grooves 17 in the water reservoir 11. When the water reservoir 11 is to be mounted or assembled with respect to the receptacle or pot 13 the contracted lower end of the water reservoir is inserted into the outwardly flared portion 21 of the receptacle or pot, the portions 17a of the indentations 17 being positioned to coincide with the knobs formed by the indentations 23 so that the latter can pass upwardly in the portions 17a after which a rotation of the water reservoir 11 in the proper direction will relatively move the portions 17b and the knobs 23 into locking relationship whereby the water reservoir and the pot or receptacle 13 will be interconnected in such manner as to enable the coffee pot to be handled as a unit and the beverage to be poured therefrom without danger of any of the elements becoming separated.

The coffee container 12 is substantially cup-shaped with its open end outwardly flared as indicated at 24 and its bottom end inwardly contracted as indicated at 25. As previously mentioned, it is necessary to provide means for allowing the excess water that accumulates upon the top of the ground coffee in the container to pass off and also to provide means permitting the escape of the air included in the mass of ground coffee. Sometimes this is attempted by perforating the side wall of the container intermediate the top and bottom thereof. In the present instance, however, it is proposed to support the coffee container in the receptacle or pot in such manner that free passages for the water and the air will be provided between the two elements of the coffee pot.

In the embodiment shown in Fig. 1 the open flared portion 24 of the coffee container is provided with a plurality of vertically disposed circumferentially spaced indentations 26 stamped in the metal of the container and forming outwardly extending projections. In the present instance these projections 26 are shown as being four in number but it is obvious that this number may be varied as desired. The diameter of the container 12 is such that it may be readily received in the open end of the pot or receptacle 13 while the diameter of the portion 24 of the container and the diametral distance between opposite projections 26 are proportioned so that when the container has been received in the pot or receptacle 13 the projections 26 will meet with the inner surface of the portion 21 of the pot and adjacent the inner end of such portion and the container will be supported within the receptacle or pot as clearly illustrated in Fig. 1.

The support for the container being formed by the meeting of the projections 26 and the portion 21 of the receptacle and such projections being spaced circumferentially of the container it will be seen that intermediate adjacent projections, the portion 21 of the pot or receptacle and the portion 24 of the container will be in spaced relationship and that should any excess water accumulate in the container at the top of the ground coffee the same will be free to flow over the open edge of the container and pass between the container and pot or receptacle into the latter. In the same way, the air included in the mass of coffee in the container will be furnished a means of escape so that such included air will not tend to hinder the percolation of the water through the coffee.

The bottom of the water reservoir 11 and the upper edge of the container 12 are maintained in spaced relationship by means of the lugs 18 formed on the bottom 15 of the reservoir as previously mentioned, such lugs meeting the upper circumferential edge of the container. Although the water reservoir and the container would not normally contact if the coffee pot is properly constructed, as illustrated in Fig. 1, it might arise due to faulty construction or other conditions that the bottom of the reservoir would contact with the edge of the container at the open end thereof and close the passage between the container and receptacle while the rotation into locking position of the reservoir would result in the formation of a ringlike scratch on the bottom 15. It is in order to preclude such eventuality that the lugs 18 are provided on the bottom of the reservoir.

As previously mentioned the present invention contemplates a construction such that the entire coffee pot including the coffee container may be formed of enamel ware or similar material. Since the formation of the minute or relatively small openings or perforations in the bottom of the coffee container would be difficult after the enameling operation, and if formed previous to the enameling operation would require close inspection and probably cleaning out after such operation had taken place, it is proposed to employ a separate bottom for the coffee container and one which is formed of a material which may be readily perforated with small openings or perforations, as for example stainless steel, aluminum or other similar materials. This separate bottom for the container is shown in Fig. 1 at 27 and is provided with a number of relatively small openings 28 which can be readily punched therein. The bottom 27 is simply a disc and can be secured substantially permanently to the container by contracting or springing the disc into the annular channel formed by the bead 29 arranged at the end of the inwardly contracted portion 25 of the container. Of course in contracting the bottom 27 care should be taken that the contraction is not so great as to contract the metal beyond its elastic limit and to thereby prevent the same from expanding into fitting engagement with the channel in the bead 29.

Figure 3:
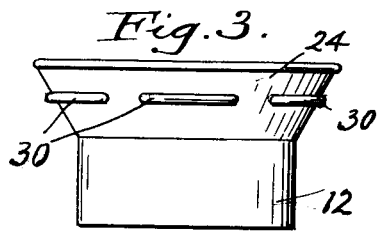
Figs. 3, 4 and 5 are elevational views (on a reduced scale) of modified forms of the coffee container.
Figure 4:
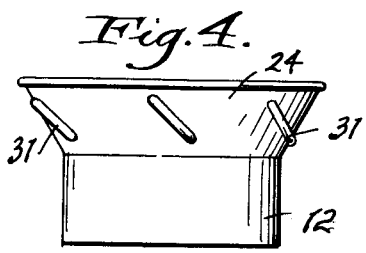

Although the projections have been illustrated in Figs. 1 and 2 as extending vertically with respect to the container attention is called to Figs. 3 and 4 wherein these projections are shown arranged in a slightly different manner. In Fig. 3 the projections are indicated at 30 and extend horizontally around the circumference of the portion 24 of the container, it being noted however that the projections are spaced circumferentially of the container to provide the required passages for the excess water and the included air. In Fig. 4 the projections are indicated at 31 and extend angularly of the portion 24, in a transverse direction, such projections 31 likewise being spaced circumferentially of the container with respect to each other.

Figure 5:
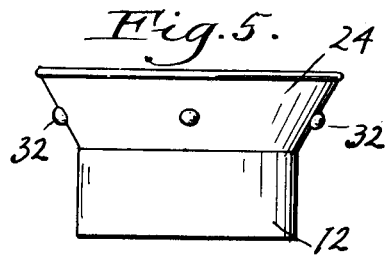

In Fig. 5 a still further form of projection is shown, namely, a projection which is simply a circular knob as indicated at 32, there being a plurality of these projections on the portion 24 of the container and the same being spaced circumferentially of each other as in the embodiments previously discussed.

It will be appreciated that in the forms of the container shown in Figs. 3, 4 and 5 the projections 30, 31 and 32 respectively will meet or contact with the flared or neck portion 21 of the pot or receptacle 13 and support the container within the latter in the same way as do the projections 26 described in connection with Figs. 1 and 2.

Figure 6:
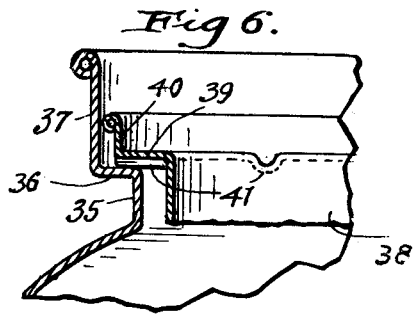
Figs. 6, 7, 8, 9 and 10 are fragmentary sectional views showing a number of different forms or embodiments of the invention which may be followed.

The modification illustrated in Fig. 6 shows the pot or receptacle at 34, the upper end of which is provided with a neck portion 35 having an outwardly extending horizontal shoulder 36 from the outer edge of which is a vertically extending portion 37. The coffee container 38 has at its open end a horizontally and outwardly extending flange 39 from the outer end of which is an upwardly extending portion 40. In order to support the container 38 in the pot or receptacle 34 and to still maintain the spaced relationship between these two elements to allow the excess water and included air to pass therebetween, the flange 39 of the container is provided on its under side with a number of projections 41 which extend substantially radially of the flange of the container and which are spaced circumferentially thereof with respect to each other. These projections 41 contact with the shoulder 36 on the pot or receptacle and support the container within the latter and provide the requisite free passages previously mentioned.

Figure 7:
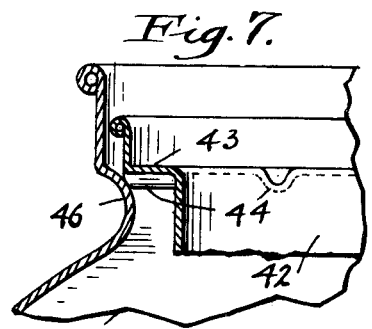

The form shown in Fig. 7 is similar to that shown in Fig. 6 in that the coffee container indicated in this view at 42 has at its upper or open end an annular flange 43 from the under side of which extend a plurality of projections 44 similar to the projections 41 in the form shown in Fig. 6. The pot or receptacle indicated in this form at 45 does not have the horizontal shoulder 36 but is provided at its neck portion with an inwardly contracted annular groove or depression whereby the wall of the neck of the pot or receptacle extends inwardly into the neck with a curved configuration as indicated at 46. When the container is arranged in the pot or receptacle the projections 44 will contact with the inwardly extending portion 46 of the neck of the pot 45 and will support the container therein, there being provided the required passages between the wall of the container, the wall of the pot or receptacle, and the projections 44.

Figure 8:
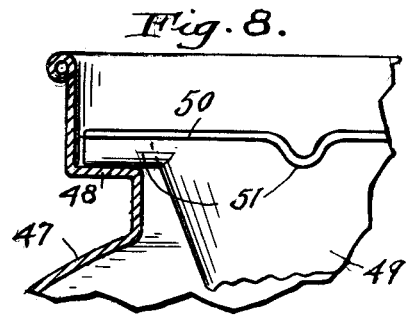

In Fig. 8 the pot or receptacle is indicated at 47 and is substantially identical with the pot or receptacle shown in Fig. 6 there being a horizontal shoulder 48 at the neck of the pot 47 corresponding to the shoulder 36 of the pot 34. The coffee container is indicated in Fig. 8 at 49 and is provided at its open end with an outwardly extending flange 50 which has a plurality of grooved projections 51 formed therein and extending radially with respect to the container and being spaced circumferentially thereof with respect to each other. These projections 51 contact with the shoulder 48 and support the container within the pot or receptacle and provide the water and air passages therebetween.

Figure 9:
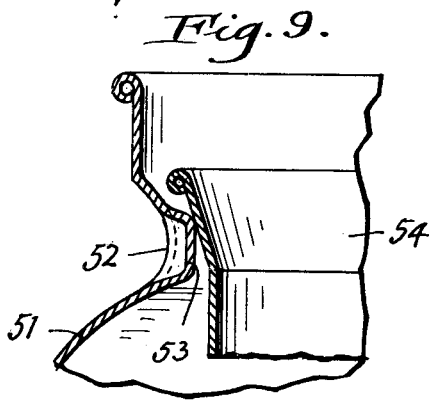
Figure 10:
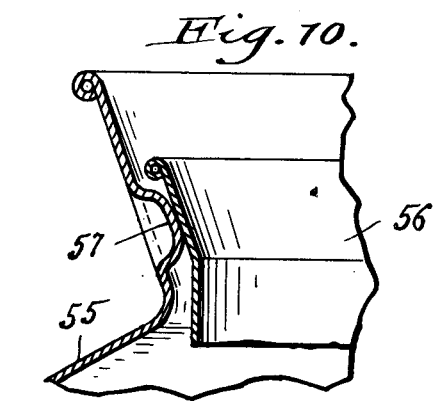

Heretofore the coffee pot has been described as constructed with the projections for supporting the coffee container in the pot or receptacle as being formed on the coffee container. However, such projections could, in all cases, be readily formed on the pot or receptacle and constructions showing such an arrangement appear in Figs. 9 and 10. In Fig. 9 the pot or receptacle is indicated at 51 and has in its neck portion a contracted annular groove 52 similar to the groove shown in Fig. 7. The bottom wall of this groove 52 is provided with a plurality of circumferentially spaced vertically extending inward projections 53. The coffee container 54 has its open end outwardly flared whereby when the container is positioned in the pot or receptacle the projections 53 on the latter will contact with the outwardly flared end of the container and support the container in the proper position, there being the desired passages for the air and water as previously mentioned. In Fig. 10 the pot or receptacle 55 and the coffee container 56 have their open ends flared in a manner corresponding to the same elements in the construction shown in Fig. 1, the flared end of the pot or receptacle 55 however being provided with a plurality of indentations 57 forming projections extending into the neck of the pot or receptacle and being spaced circumferentially thereof with respect to each other. The indentations 57 extend substantially vertically of the flared neck of the pot or receptacle and contact with the flared open end of the coffee container so as to support the latter therein in spaced relation to the pot or receptacle. It will be understood that in the forms illustrated in Figs. 3–10 inclusive the water reservoir is assembled in the receptacle or pot in the same manner as disclosed in Fig. 1.

A brief description of the manner in which the coffee pot is used will now be given with particular reference to the form shown in Figs. 1 and 2, it being remembered however that this form of construction might be varied in the manner shown in the remaining figures of the drawings but that its mode of use would remain the same. A quantity of coffee ground to the proper degree of fineness is placed in the coffee container 12 and the latter then passed into the open end of the pot or receptacle 13 until the projections 26 contact with the flared portion 21 thereof. When this has been done the container 12 will be supported in the pot or receptacle and will extend into the main body of the same with the flared open end portions of the pot and the container in spaced relation except at the points where the projections 26 contact with the portion 21 of the pot. The water reservoir 11 is then positioned in the open flared end of the pot or receptacle by passing the projections 23 into the portions 17a of the depressions 17 in the reservoir 11 and then turning the reservoir in the proper direction to effect the interlocking engagement between projections 23 and the portions 17b of the depressions 17. After the elements of the coffee pot have been thus arranged a quantity of water substantially at boiling temperature is poured into the reservoir 11 and then the lid 14 placed thereon. This water passes through the openings 16 in the bottom 15 of the reservoir and comes into contact with the ground coffee in the coffee container. As the water commences to percolate through the ground coffee the latter expands and tends to compact into a mass in which there are particles of included air. Initially the water percolates through the ground coffee rather rapidly and extracts certain of the ingredients such as free aromatic oils therefrom. The water which is percolated through the ground coffee of course passes through the openings 28 in the bottom plate 27 of the coffee container and is received in the pot or receptacle 13. However, after the ground coffee has expanded and become a compact mass the percolation of the water therethrough is retarded until free passage of the water is again effected through the coffee by the releasing of the confined air. It often occurs that at this instant an excess of water momentarily accumulates above the coffee in the container. The manner in which the container is supported in the pot or receptacle provides a means for allowing this excess water to flow over the upper edge of the container and to pass between the container and the pot or receptacle into the latter, as may also the air which has been included in the mass of ground coffee thus preventing the water from overflowing the flange 21 and soiling the outside of the pot.

Although a number of preferred embodiments of the invention have been illustrated and described herein it should be understood that the invention is susceptible of various embodiments and adaptations within the scope of the appended claims.

Having thus described my invention, I claim:

1. In a coffee pot for making drip coffee, a receptacle for the beverage having an outwardly flared open end, a container for the ground coffee having an outwardly flared open end and a separate perforate bottom wall permanently attached thereto, said flared portion of the container being provided with a plurality of projections spaced with respect to each other circumferentially thereof and adapted to contact with the flared portion of the receptacle to support the conainer therein, and a water reservoir supported by the receptacle above the container, said receptacle and said reservoir having cooperating portions forming a bayonet-lock connection therebetween.

2. In a coffee pot for making drip coffee, a receptacle for the beverage, a separate container for the ground coffee, and a separate water reservoir, said receptacle and said container having cooperating portions for supporting the container within the receptacle and inwardly of the open end thereof and providing passages between the receptacle and container, said receptacle and said reservoir having cooperating portions supporting the latter in the open end of the former and spaced above said container.

3. In a coffee pot for making drip coffee, a receptacle for the beverage having a reduced open neck, a separate container for the ground coffee, and a separate water reservoir, said container having portions contacting with the inner surface of said open neck of the receptacle to support said container in the receptacle inwardly of the outer end of said neck and to provide passages between the neck and container, said receptacle and said reservoir having cooperating portions supporting the latter in the said neck of the receptacle and spaced above said container.

4. In a coffee pot for making drip coffee, a separate receptacle for the beverage having a reduced open neck, a container for the ground coffee, and a separate water reservoir, said container having circumferentially spaced portions cooperating with a portion of the inner surface of said neck to support the container within the receptacle and to provide passages therebetween, said receptacle and said reservoir having cooperating portions supporting the latter in the reduced neck of the former and spaced above said container.

5. In a coffee pot for making drip coffee, a separate receptacle for the beverage having a reduced open neck, a container for the ground coffee, said container and said receptacle having cooperating portions in the form of circumferentially spaced projections located on one of the members for supporting the container within the receptacle and to provide passages between the container and the receptacle, and a separate water reservoir, said receptacle and said reservoir having cooperating portions supporting the latter in the neck of the former and spaced above said container.

6. In a drip coffee maker, a pot having a neck with a downwardly and inwardly inclined seat formed in its walls, a coffee container mounted interiorly of said neck, said container having its walls inclined substantially to correspond to the inclination of said seat and having in said walls outwardly thrust portions for resting upon said seat and having other portions intermediate said seating portions removed from said seat to provide avenues for drainage of overflowing water of ebullition.

PAUL C. GUNTRUP.